Feb. 9, 1926.
J. VAN BUREN
1,572,256
WRAPPING MACHINE
Filed Nov. 26, 1920
7 Sheets-Sheet 3
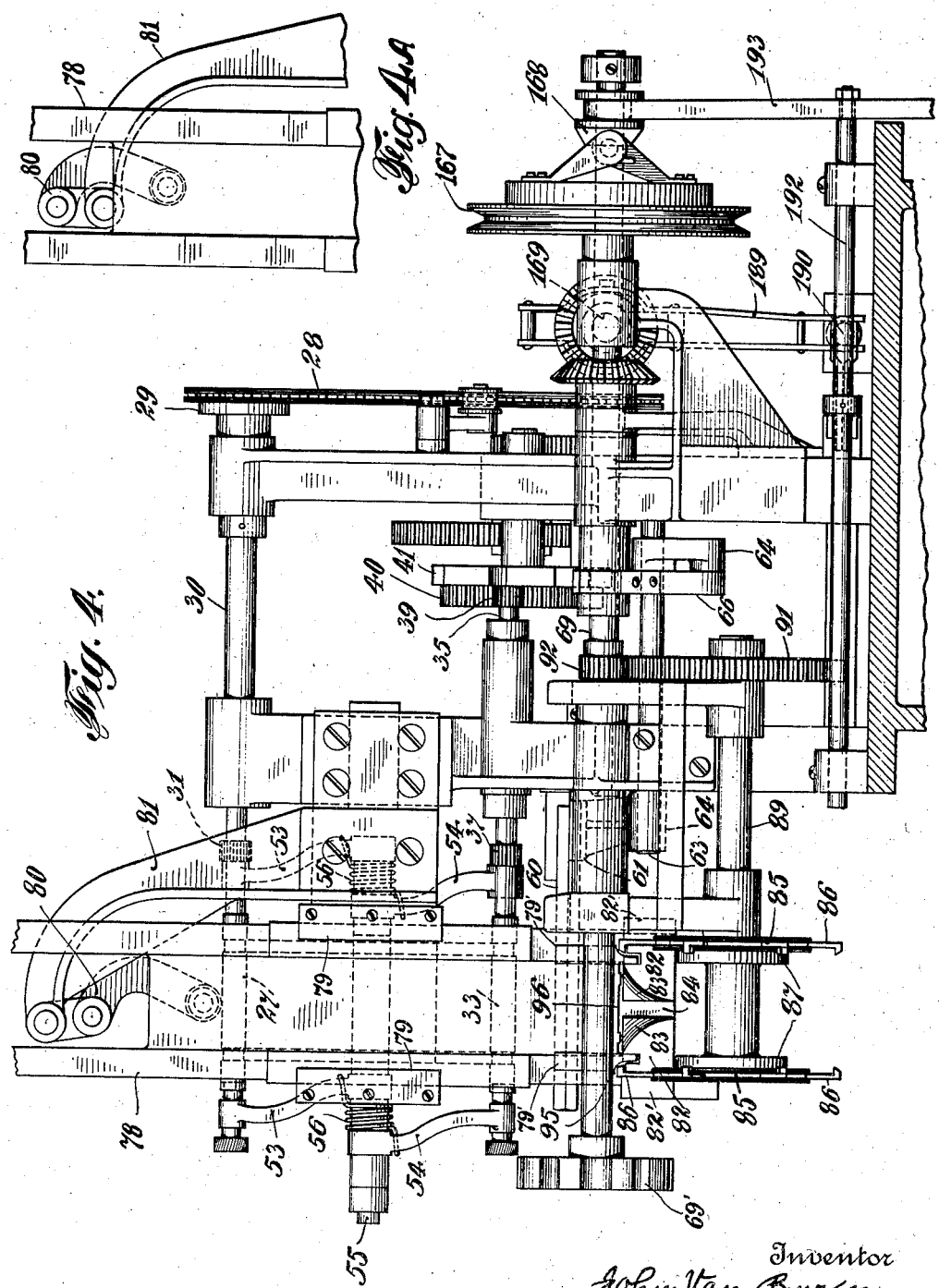
Inventor
John Van Buren
By Attorney
Paul Carpenter Feb. 9, 1926. 1,572,256
J. VAN BUREN
WRAPPING MACHINE
Filed Nov. 26, 1920 7 Sheets-Sheet 4
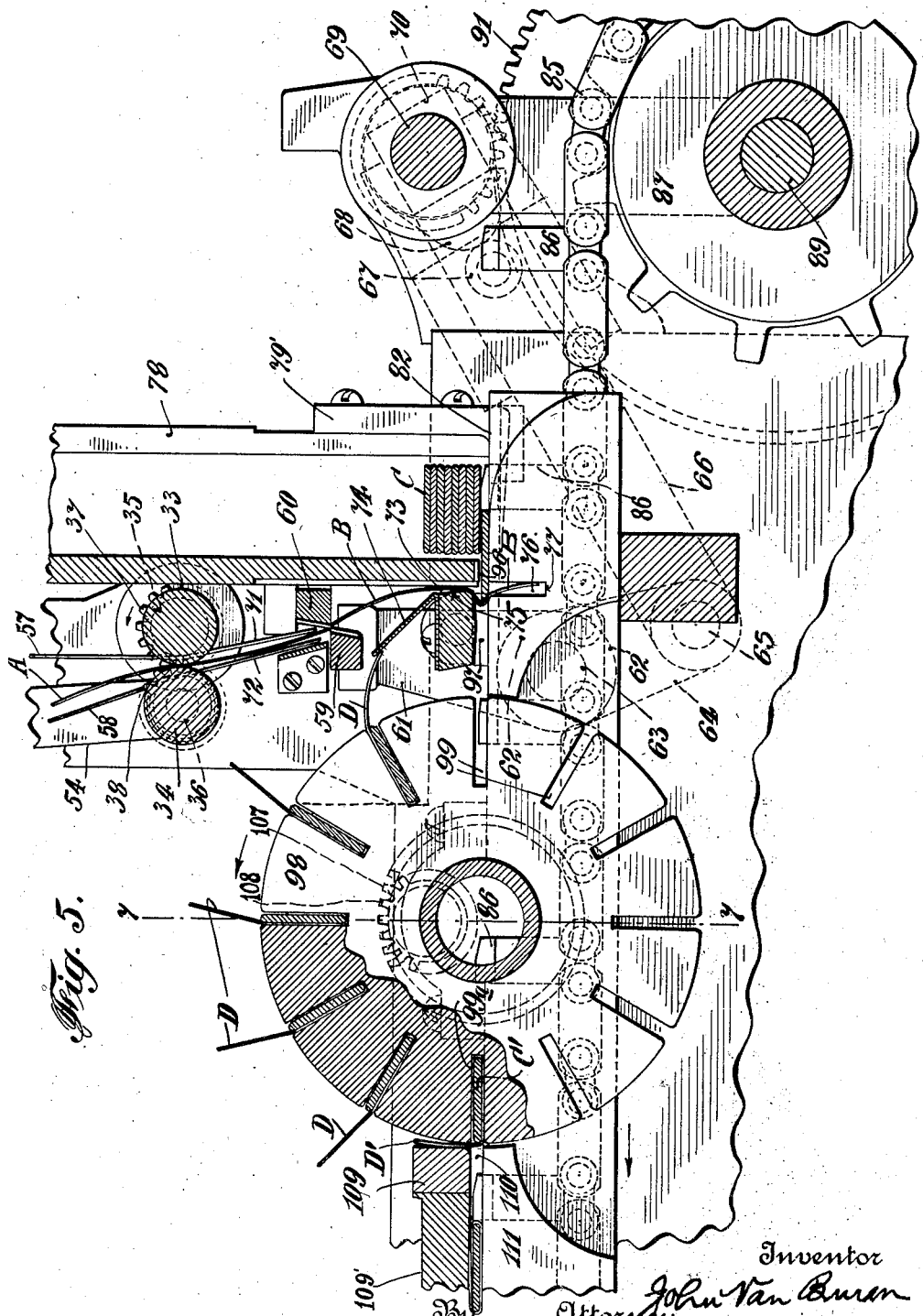
Inventor
John Van Buren
By
Attorney

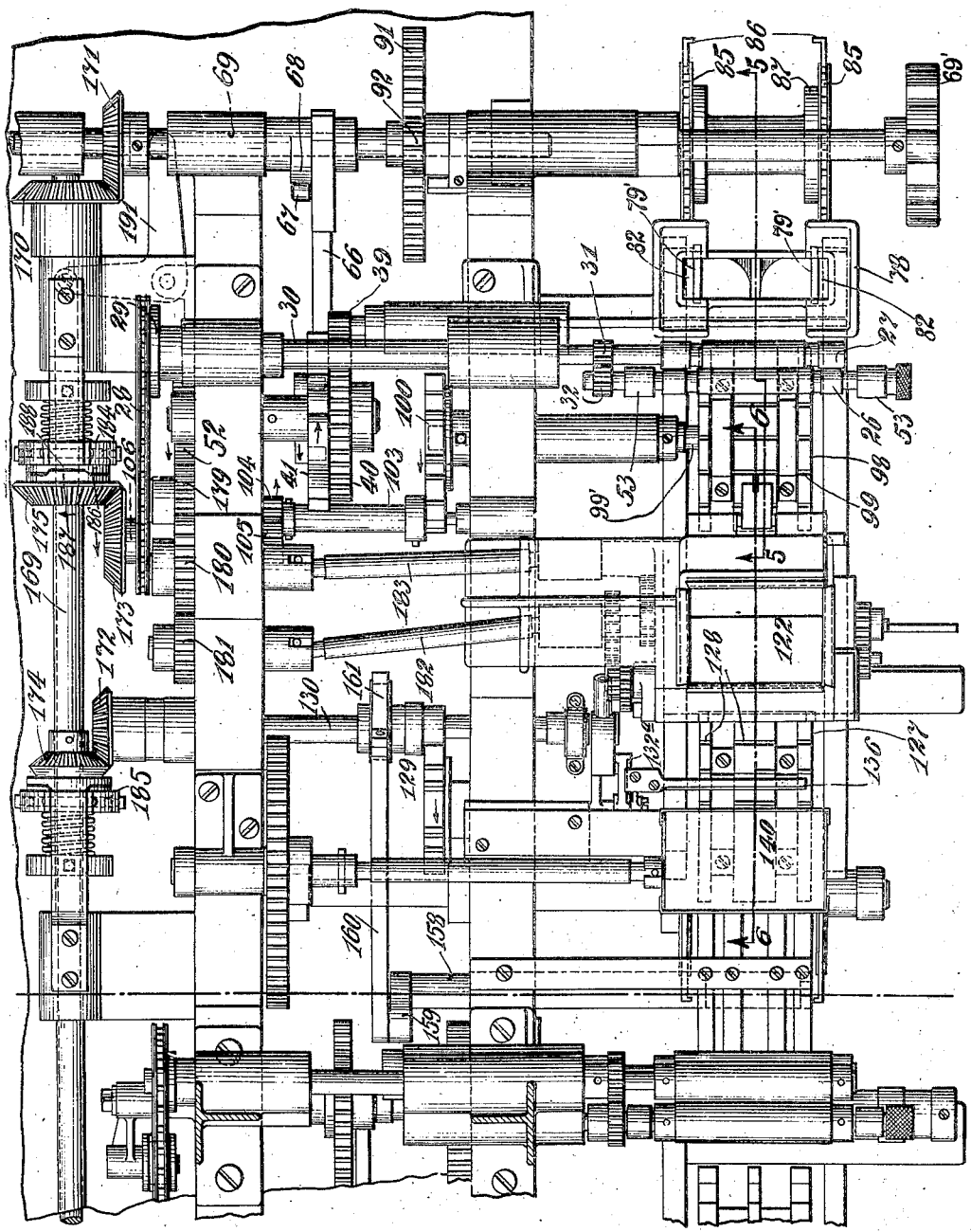

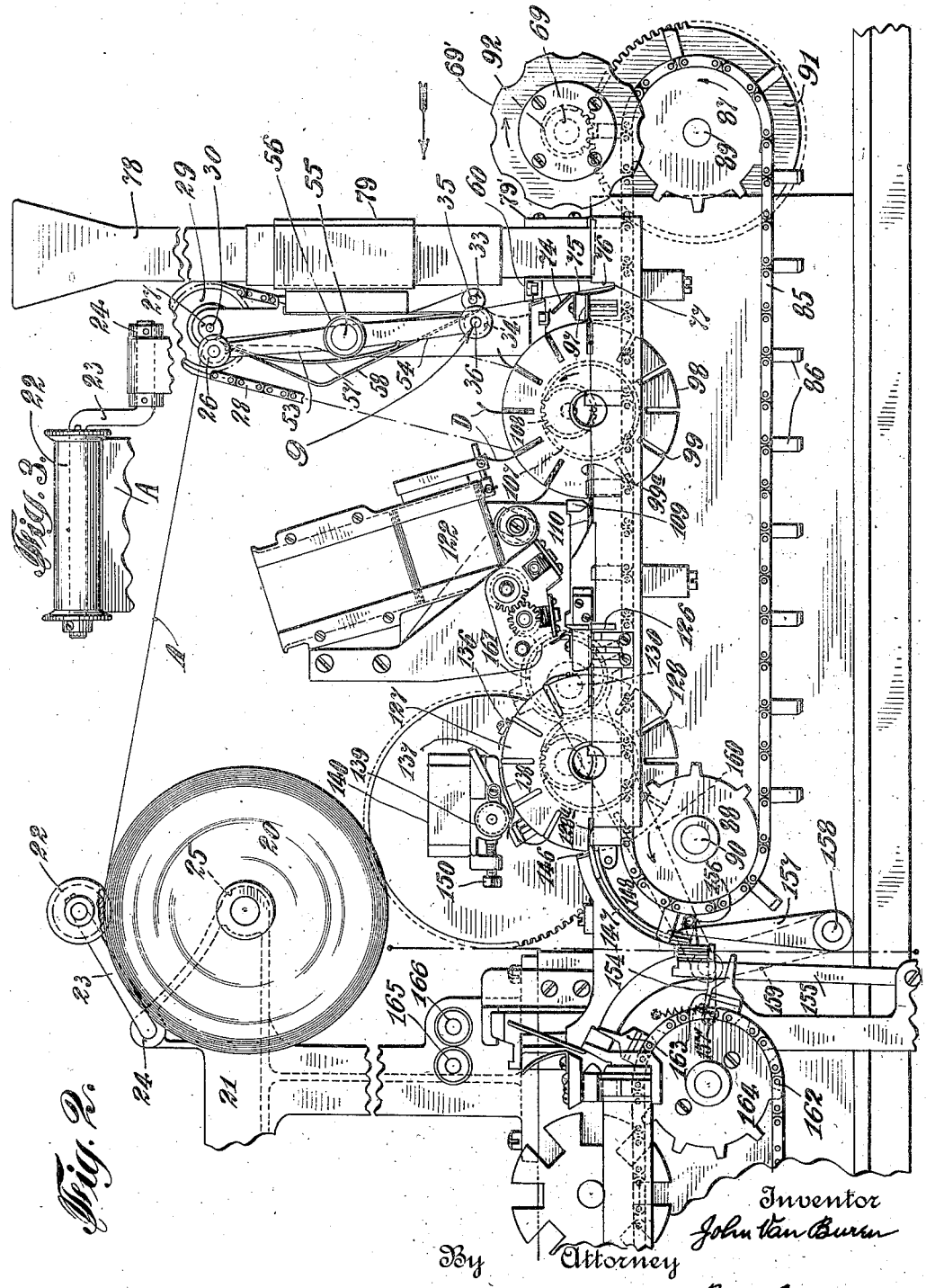

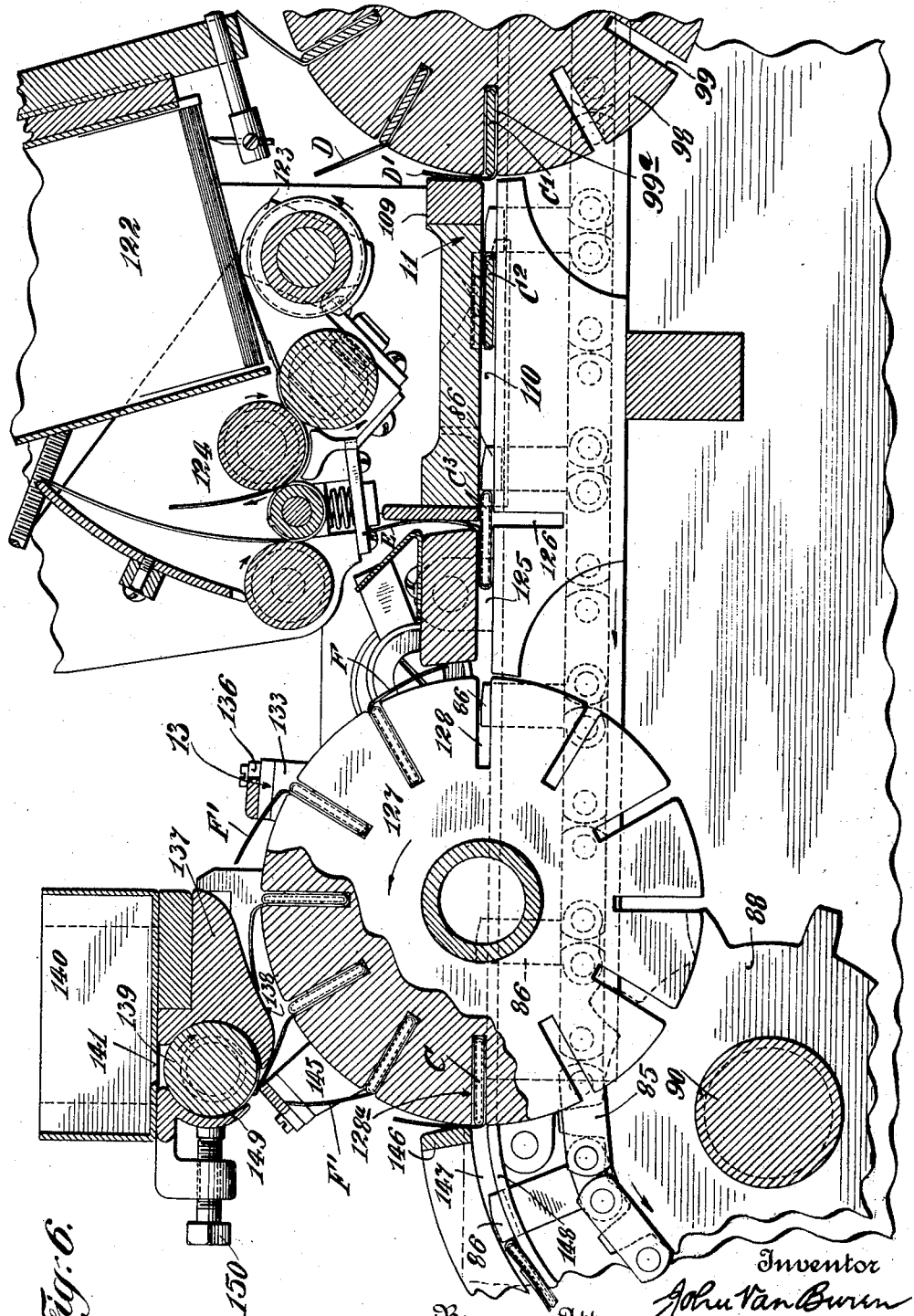

Feb. 9, 1926.
J. VAN BUREN
WRAPPING MACHINE
Filed Nov. 26, 1920
1,572,256
7 Sheets-Sheet 6
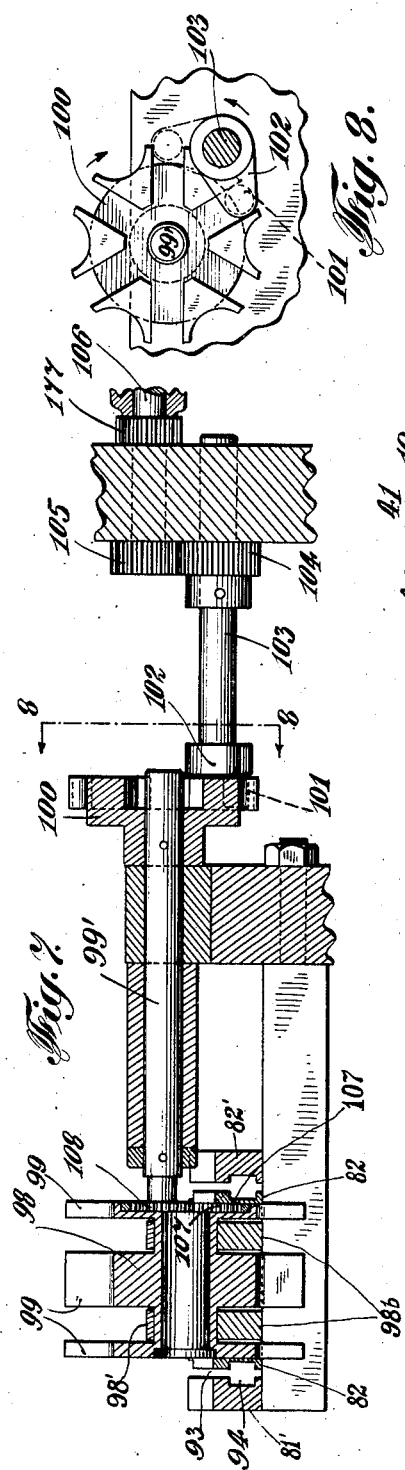
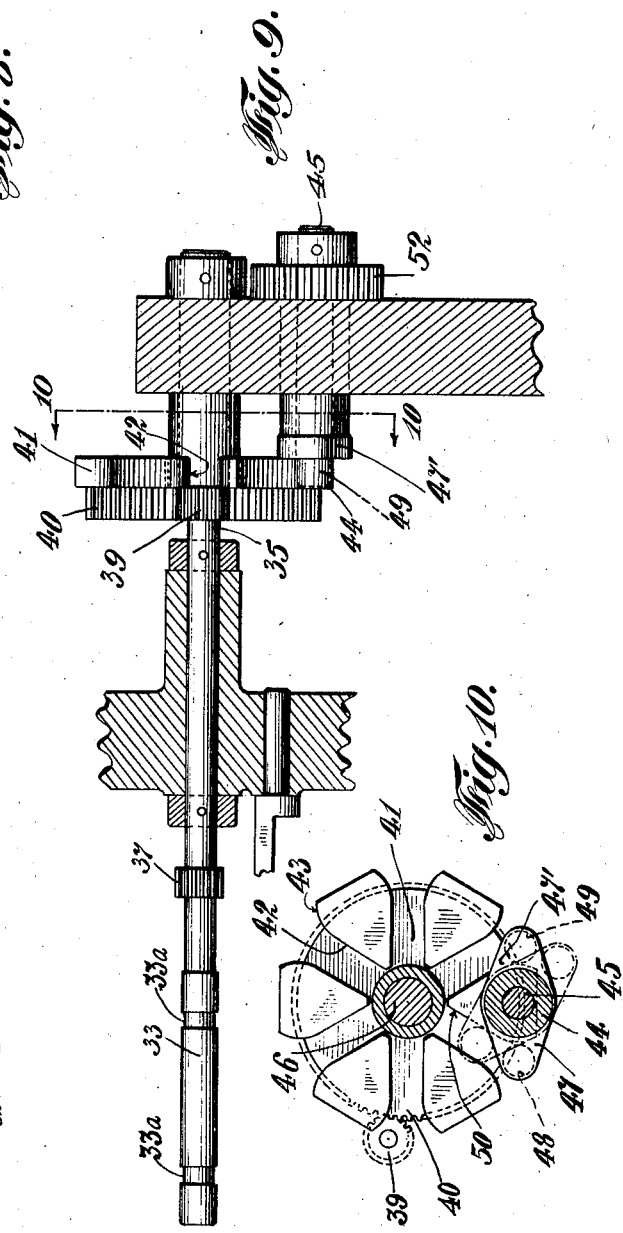
Inventor
John Van Buren
By Attorney
Paul Carpenter

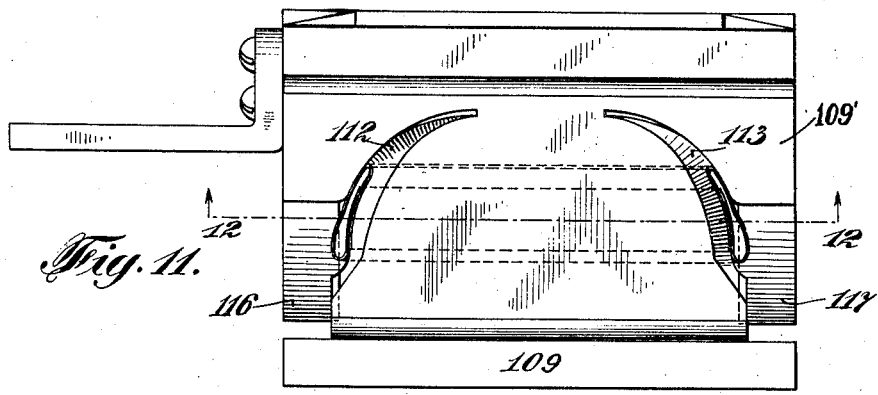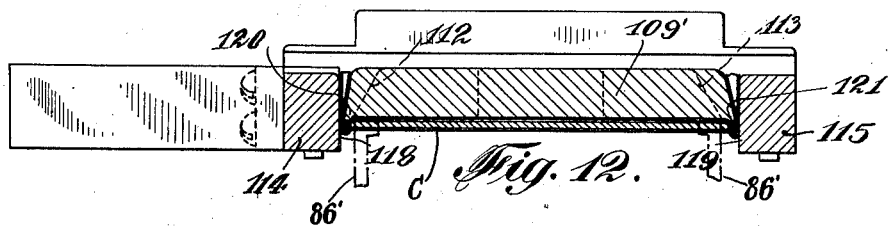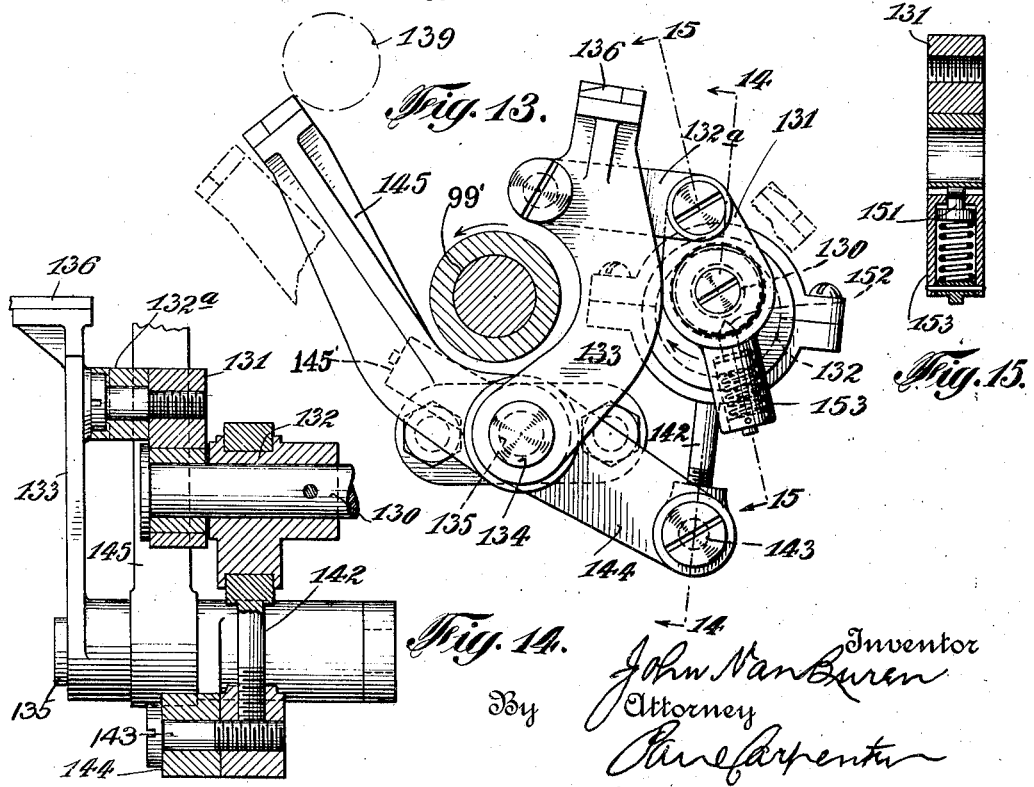

Patented Feb. 9, 1926.

1,572,256

UNITED STATES PATENT OFFICE.

JOHN VAN BUREN, OF BROOKLYN, NEW YORK, ASSIGNOR TO AMERICAN CHICLE COMPANY, OF NEW YORK, N. Y., A CORPORATION OF NEW JERSEY.

WRAPPING MACHINE.

Application filed November 26, 1920. Serial No. 426,565.

*To all whom it may concern:*

Be it known that I, JOHN VAN BUREN, a citizen of the United States, and a resident of Brooklyn, in the county of Kings and State of New York, have invented certain new and useful Improvements in Wrapping Machines, of which the following is a specification.

The present invention relates in general to wrapping and packing machines, and more particularly to machines for wrapping individual articles and then collecting them in groups and finally wrapping such groups into packages, and has special reference to the provision of a machine peculiarly adapted for wrapping sticks of so-called chewing gum and then assembling a predetermined number of such wrapped stick and forming therefrom a commercial package.

The machine divides itself broadly considered into two general parts, the first including the means and methods employed for wrapping the individual sticks, and the second including the means and methods for collecting and wrapping a number of the sticks wrapped by the first part of the machine. For convenience in illustration and description, part of the machine is shown more fully in detail in co-pending companion application Serial No. 426,566 filed concurrently herewith.

The machine adapted for producing the desired results above suggested includes in general groups of elements for performing the following functions and operations:

1. Positioning a suitable piece of wrapping paper, made of correct size as by cutting it from a roll;
2. Feeding against the paper the article to be wrapped;
3. Causing the wrapping paper to encompass the article, including folding the ends thereof;
4. Positioning a suitable label in the path of movement of the article and feeding the latter thereagainst;
5. Causing the label to encompass the wrapped article and thereby fix the wrapper in position;
6. Assembling the wrapped and labelled articles into groups;
7. Positioning a suitable piece of wrapping paper in the path of movement of the assembled group;
8. Feeding against the paper the assembled group;
9. Causing the wrapping paper closely to encompass the group, including folding the ends and sealing the wrapper as an entirety in folded position;
10. Positioning a suitable label in the path of movement of the wrapped and sealed package, and feeding the latter thereagainst;
11. Causing the label to encompass the wrapped and sealed package and fix the wrapper thereof in position;
12. Ejecting the completed package from the machine.

The principal objects of the present invention are an improved machine and method for producing an improved wrapping and packaging of articles of the character referred to, and one which will accomplish such functions and operations most economically, together with an improved package produced thereby, and such other benefits and advantages as may hereinafter appear.

While machines containing the present invention have other fields of usefulness, it is found particularly adapted for use in connection with articles of the general shape and character of sticks of "chewing gum", and it is accordingly illustrated in connection with such material as a matter of convenience, in the accompanying drawings, wherein—

Figure 1 is a top plan view of the general assembly of the machine adapted to perform the first five of the functions and operations above referred to;

Figure 2 is a side elevational view of the machine of Figure 1;

Figure 3 is a view of a detail of a paper centering spool shown in Figure 2;

Figure 4 is a vertical end elevational assembly view of the machine of Figure 2 looking in the direction indicated by the arrow;

Fig. 4ª is an elevation of a part of the feed hopper showing it in its raised position;

Figure 5 is an enlarged detailed sectional elevational view of certain parts of the machine at the right hand end of Figure 2 taken on the line 5—5 of Figure 1;

Figure 6 is an enlarged detailed sectional elevational view of certain parts of the machine at the left hand end of Figure 2, taken on the line 6—6 of Figure 1;

Figure 7 is a vertical sectional view of a group of elements shown in Figures 1, 2 and 5 and taken on the line 7—7 of Figure 5;

Figure 8 is an elevational view of part of Figure 7 looking in the direction indicated by the arrows on line 8—8 of such figure;

Figure 9 is a fragmentary vertical view, partly in section, of the group of elements indicated generally at 9 in Figure 2;

Figure 10 is a vertical view of part of Figure 9 looking in the direction indicated by the arrows on line 10—10 of such figure;

Figure 11 is a top plan view of a group of elements indicated generally at 11 in Figure 6;

Figure 12 is a sectional view taken on the line 12—12 of Figure 11 looking in the direction indicated by the arrows;

Figure 13 is a view partly in vertical section of a group of elements indicated generally at 13 in Figure 6;

Figure 14 is a sectional plan view taken on the line 14—14 of Figure 13; and

Figure 15 is a sectional plan view taken on the line 15—15 of Figure 13.

As a matter of convenience in description, the several groups of elements will now be described according to the order followed in performing the functions and operations hereinabove outlined.

Referring first to Figures 1 and 2, a suitable roll, 20, of paper, A, preferably what is known as waxed paper, is rotatably mounted in a bracket, 21, supported by the frame work of the machine. The strip of paper A is fed to positioning and cutting off mechanism shortly to be described. For preventing lateral displacement of the paper strip A a spool, 22, is rotatably mounted on a support 23 pivoted at 24 in the bracket 21, such spool 22 having beveled flanges bearing on the marginal perimeters of the roll 20. The distance from the axis, 24, to the point of contact of the spool, 22, with the roll, 20, is substantially equal to the distance between the axis 24 and the core 25 of the roll 20. As a result of this arrangement the spool 22 will contact with the roll 20 at suitable points regardless of the diameter of the roll.

Referring now more particularly to Figures 2 and 5, the paper strip A is fed between rolls 26 and 27, the latter of which as shown is continuously driven by means of a chain 28 running over sprocket, 29, fixed to the shaft, 30, upon which the roll 27 is mounted. To assure that the rolls 26 and 27 move in unison, they are provided with intermeshing gears indicated at 31, 32, (Fig. 1).

Positioned below the rolls 26, 27, are the feed rolls 33, 34 carried by shafts 35, 36 which as shown are driven in unison by the intermeshing gears 37, 38, (see Figures 5 and 9).

The shaft, 35, is intermittently driven by virtue of the engagement of the gear 39 (Fig. 9) with the gear 40 carried by the novel form of wheel 41 intermittently driven as now to be described. As will be apparent on reference to Figure 10, this novel form of wheel includes a number of radial slots, 42, having curved termini, 43, of a contour adapted to conform to the contour of the driver 44. This driver, 44, is mounted for rotation about the axis of a shaft 45 spaced from the axis 46 of the gear 40 and wheel 41 and includes opposed radial arms 47, 47', upon the ends of which are mounted driving pins 48, 49. The termini, 43, are concentric with the axis 45 in certain positions of the wheel 41 and the pins 48 and 49 are so spaced that when they are in contact with opposed curved surfaces, 43, the wheel, 41, is restrained from any movement whatever. On the other hand, when these pins 48, 49 are moved out of contact with these curved surfaces 43, the pin 48 (in the present case) is moved into contact with the cam surface, 50, and imparts rotatory movement to the wheel 41. The driver, 44, is mounted on the shaft, 51, and is driven by means of the gear 52 (see Figure 9).

As a result of the continuous movement of the rolls 26, 27 and the intermittent movement of the rolls 33, 34 a slack in the paper strip A is intermittently produced between the two pairs of rolls, the purpose of which will presently appear.

Reverting to Figures 2 and 4, it will be seen that the pressing rollers 26 and 34 are rotatively carried in pairs of upper and lower yoke members 53 and 54 which in turn are pivoted upon a shaft 55 and are held in yieldingly resistent contact with the rollers 27 and 33 by means of the springs 56. It will thus be discerned that the yoke members 53, 54 carried by the shaft 55 are so arranged as to permit the use of but a single spring at each end of the shaft acting upon both an upper and a lower yoke member.

Experience teaches that where paper is fed in such a manner as to present slack there is a very objectionable tendency of the paper to distort and crumple, to overcome which there is here provided guide members, 57, to impart some transverse curvature. In the form shown, plates are convenient for the purpose. A supplemental guide, 58, is provided for directing the initial feed of the papers from the rolls 26, 27 to the rolls 33, 34.

For severing the required piece of paper from the strip A, there is provided a shearing knife, 59 (Fig. 5), coacting with a stationary cutting block, 60. The cutter, 59, is carried by the upper arm, 61, of the lever, 62, pivoted at 63 intermediate its ends. As a result of this, the cutter, 59, is moved bodily toward the block 60 in the arc of the circle. Further, to enhance the cutting action of the cutter, 59, its active edge is beveled and the co-acting edge of the block, 60, is complementarily beveled, as is clearly to be seen on inspection of Figure 5.

For imparting intermittent oscillatory motion to the cutter 59, the lower arm, 64, of the lever, 62, is pivoted at 65 to the lower end of the slidably mounted connecting rod, 66, reciprocated by means of the engagement of a roller 67 carried by such arm with the cam, 68, on the main driving shaft 69. The roller is held against the cam by a spring (not shown). The rod, 66, is bifurcated at its upper end and supported in its reciprocation upon a square block, 70, rotatively mounted on the shaft 69.

For feeding the paper strip A substantially vertically downwardly between the cutters 59, 60, the guides 57 and 58 are continued as shown at 71 and 72 to direct the paper in the desired relation to the knives. The rollers 33, 34 are grooved to clear these guides, as one of them is shown at 33ᵃ in Figure 9. The paper is further guided into position to be struck by the gum stick C by means of the angularly arranged upper surface of a guide 74 and the angular surface 75 of the guide passage 73. A guide slot, 76, is provided to receive the lower edge of the wrapper B and the bottom 77 thereof serves as a limit stop for the movement of the paper.

It will be observed that the point of contact between the cutters 59, 60 is displaced forwardly of the guide passage 73 through which the paper is fed into position to be struck by the stick of gum as shortly to be described. The cut-off portion B of paper therefore assumes a curved or buckled position shown in Figure 5 which materially assists the mechanism in performing its function.

The intermittent movements of the cutter 59 and of the lower feed rolls 33, 34 are so coordinated that the cutter acts whilst the rolls are stationary.

Inasmuch as it is necessary to prevent accumulation of paper between the pairs of rolls 26, 27 and 33, 34, the lower rolls 33, 34 must not only be driven at a much higher average rate of peripheral speed than the upper rolls 26, 27, in order to feed the paper intermittently downwardly but also desirably have an additional slight increment of average speed in order to prevent any possibility of such accumulation of paper.

Referring now more particularly to Figures 2, 4 and 5 at the forward (right-hand) end of the machine, there is provided a hopper, 78, for receiving a stack of gum sticks, C, the hopper being slidable vertically in the bracket support 79, whereby the gum stick feed may be readily discontinued at will by operation of the crank mechanism indicated generally at 80 (Figs. 4 and 4ᵃ), and carried by the bracket 81. To the lower end of hopper 78, spaced blocks 82 are affixed by a bracket 79′. The lowermost sticks of gum rest upon these blocks, from which, when the hopper is lowered, they are successively advanced by feeding mechanism shortly to be described.

One of the difficulties in handling articles such as sticks of gum is due to its relatively fragile crumbly nature and the powdered material (such as sugar) employed for the prevention of sticking, which causes the machine to become clogged by loose portions of such material carried forward in the operation thereof. To minimize the accumulation of such objectionable material, the blocks, 82 are beveled off as indicated at 83, which permits such crumbly and powdered material to gravitate downwardly through the slot 84, and be discharged from the machine.

For advancing the sticks of gum C successively from the hopper, 78, against the wrapper B there is employed a pair of spaced chains, 85, provided with outstanding fingers, 86, adapted successively to contact with successive sticks of gum C. The chains, 85, are carried by sprockets 87 and 88 on shafts 89 and 90, the sprockets, 87, being positively driven in the direction indicated by the arrow (Figure 2) by the engagement of the large gear 91 fixed on the shaft 89, with a pinion 92 on the shaft 69.

To provide clearance for the chains 85 and the fingers 86, the passages 93 widened at 94 (see Figure 7) are provided between the blocks 82 and 82′, the lower portion of the hopper 78 being channeled out as indicated at 95 to provide clearance for the hooked portions of the fingers 86.

The location of the fingers 86 on the chains 85 is such that they move the gum sticks C against the paper B at a time when the wrapper B is stationary.

When a pair of the fingers, 86, strike the lowermost gum stick C they advance it from the hopper, 78, through the slot 96 against the wrapper B positioned across said slot and upon further movement of the fingers, 86, the gum stick C is advanced through the slot 97 carrying with it the wrapper B which through contact with the edges of the slot 97 is folded against the gum stick C.

The relation of the gum stick C to the paper B is such that the lowermost portion of the wrapper B is shorter than the width of the gum stick C, whereas the uppermost portion is longer, and consequently the folding of the lowermost portion of the wrapper C is completed, whereas the uppermost portion has an extending flap D (see Figures 2 and 5).

For receiving the partially wrapped gum sticks C and folding the outstanding flap D upon the gum, there is provided a radially slotted rotating conveyer member 98. The several slots 99 are so spaced and arranged as successively to form substantial continuations of the passage 96 and 97, of a depth just sufficient to accommodate the partly wrapped stick of gum C with the flap D extending outwardly beyond the periphery of the conveyer member 98.

For advancing the rotating conveyer 98 step-by-step (see Figures 7 and 8) there is employed a shaft 99′ carrying a star wheel 100 driven by a pin 101 on an arm 102 fixed to a drive shaft 103 which has at its opposite end a pinion 104 meshing with a pinion 105 on a driven shaft 106.

The conveyer barrel 98 being stationary, as soon as the fingers 86 have pushed a gum stick C into a slot 99, the movements of the several parts are so coordinated that an increment of the step-by-step movement of the conveyer 98 is immediately effected so as to remove the gum stick C out of the path of movement of the fingers 86 and position another of the slots 99 in registry with the passage 97 and ready to receive the succeeding stick of gum.

Inasmuch as the advantages of a radial arrangement of the slots 99 and of a movement of the fingers diametrically of the barrel 98 are obvious. the shaft 99′ has been so positioned as to be out of the path of the movement of the fingers 86, which has been accomplished by providing the barrel 98 with an internal gear, 107, meshing with a pinion, 108, upon the shaft 99′ which is carried eccentrically of the axis of rotation of the barrel 98 and thus out of the plan of movement of the fingers. As will be seen on reference to Figure 7, the gearing elements, 107, 108, are within the outline of the barrel 98 and thus also out of the path of the traverse of the adjacent row of fingers 86.

The barrel 98 is divided as shown in Figure 7 to provide concentric reduced portions 98$^a$ which are rotatably supported in bearings 98$^b$.

It will be observed that the position of the wrapper B when struck by the gum stick C is spaced from barrel 98 and that therefore the initial folding of the wrapper B takes place while the stick of gum is being fed through the slot 97 and before it reaches the slot 99, thus avoiding any abrasure of the margins of such slot and any distortion of the wrapper.

As will be apparent on viewing Figure 5. as the barrel 98 revolves contra-clockwise each succeeding flap D is bent against the perimeter of the barrel 98 by means of the block 109, and as the barrel 98 reaches the position shown in Figure 5 and stops there for the introduction of the gum stick C as above described, similarly the diametrically opposite slot, 99$^a$, with a partly wrapped gum stick, C′, in inverted position therein is opposite to and in alignment with a slot 110 between the block 109 and the guides, 111, which may be made integrally with the blocks 82′ heretofore described. In this position of the barrel 98 the flap D′ is held in the position shown in Figure 5.

On reference to Figure 5 it will be seen that while one pair of the fingers 86 are moving a gum stick C into a slot 99, another pair of such fingers, 86, in advance thereof will remove the partially wrapped gum stick C′ from the slot 99$^a$ into the passage, 110, and due to the contact of the flap D′ with the block 109 will cause such flap D′ to be folded down upon theretofore completely folded short flap of the wrapper B. This completes the intial wrapping of the gum stick C save for the folding of the projecting ends of the wrapper B.

This end folding is accomplished by means of the folding-block, 109′, illustrated in detail in Figures 11 and 12, wherein as will be clear from an inspection of the drawing, the block is made of the full width of the wrapper B and is provided with oppositely disposed inwardly converging curved slots 112, 113 of the character shown in these figures.

It will be noted that the portions 114, 115 of the folding block 109′ depend below the path of movement of the gum stick C and are beveled as indicated at 116, 117 in such a manner that as the gum stick C is fed forwardly the outer edges of the wrapper B are guided upon such beveled portions which coact with the curved slot 112, 113 and with the inner walls 118, 119 of the members 114, 115 to cause the free ends of the wrapper B to be folded against the gum stick C.

To facilitate this folding operation, the block 109′ is provided in the path of movement of the gum stick C with creasing blades 120, 121 which not only serve to assist in bending the free ends of the wrapper B but also impart a permanent crease thereto which aids in the eventual formation of an improved and most compact package.

As the gum stick wrapped as just above described is moved from the position indicated at C$^2$ through the passage 110, (see Figure 6), a label E is presented across its path of movement. The stream of labels E may be fed into position by the mechanism shown which comprises the hopper, 122, separator, 123, gearing indicated generally at 124 and associated parts, all fully described and claimed in the copending companion application of John Van Buren, Serial No. 412,348.

The general arrangement of means for deflecting and positioning the label E in the path of the wrapped gum stick is similar to that indicated by the reference numerals 73, 74, 75, 76, 77 in Figure 5.

This label E is supported in the slot 126 in such a position that it extends across the passage 125, so that as the wrapped gum stick is carried by the fingers 86, it carries the label with it. The label E is so positioned in the slot 126 that in this initial folding the lowermost part of the label E is folded against the wrapped gum stick and the uppermost portion thereof has an extending flap F.

This conveyor barrel 127, like the conveyor 98, has a similar series of radial slots 128 into which the fully wrapped and partially labelled gum sticks are successively fed by the fingers, 86. This barrel 127 is intermittently driven with a step-by-step motion by means of internal gearing (not shown) and by a star-wheel structure indicated generally at 129 (Figure 1) in all substantial respects similar to that indicated at 99′, 100, 101, 102, 103, 107, 108 in Figures 7 and 8 of the drawings.

Upon the shaft 130 by means of which motion is imparted to the star-wheel mechanism indicated generally at 129, there is mounted a crank, 131, and an eccentric, 132. To this crank, 131, is pivoted a link, 132ª in turn pivoted to an arm 133 pivoted at 134 to a stub shaft 135 (see Figures 13 and 14). The arm 133 carries at its outer end an oscillating flap reversing rod 136 which, when it moves clockwise, passes over the free edge of the label flap F and then when it moves contra-clockwise passes under the free edge of the label flap F and bends it into the position indicated at F′. On continued movement of the barrel 127 and while the reversing rod 136 is holding the flap F in the position indicated at F′, (Fig. 6) this flap is directed under the guide block 137 provided with the curved guiding surface 138 along which the flap F′ moves eventually, upon release of the tension due to bending, directing itself towards the roller 139 upon the surface of which adhesive is fed by gravity from the reservoir 140 through the opening 141.

The eccentric 132 carries a yoke 142, to the opposite end of which is pivoted at 143 a link 144 carried by the stub-shaft 135 and spring pressed by an arrangement within a housing 145′ similar to that shown in Figure 15 into driving engagement with the presser bar 145 also carried on said stub-shaft 135.

Again reverting to Figures 6 and 13, it will be noted that the eccentric 132 and associated parts are so proportioned and arranged as to bring the presser bar 145 into contact with the flap F′ while the barrel 127 is momentarily stationary with the flap F′ closely adjacent to the adhesive feeding roll 139. The extent of movement of the presser bar 145 is such as to cause said bar 145 to press the flap F′ against the feed roll 139 and thereby apply adhesive to the inner margin of the flap F′.

Further movement of the barrel 127 will bring flap F′ into contact with a folder block 146, to a position adjacent the barrel as shown in Figure 6, when the slot 128ª registers with the passage 147 formed between said block 146 and the guide 148. Continued movement of the chains 85 will bring a pair of the fingers, 86, against the gum stick C in the slot 128ª and advance such gum stick into the passage 147, such operation pressing the gummed flap F′ against the opposite end of the label E and sealing the label in position, thereby holding the wrapper B against displacement.

In order to provide an adequate feed of adhesive from the reservoir, 140, the roller, 139, is driven slowly, and the co-acting feeding and spreading element, 149, is made yieldable and has a variable threaded member, 150, abutting thereagainst, by means of which it may be adjusted.

To prevent breakage in case of overload upon the arm, 133, or any of its associated parts, the crank, 131, is yieldingly held in engagement with the shaft, 130, by means of a spring-pressed pin, 151, having a beveled terminal, 152 engaging a V-slot in the hub of the crank 131, supported in a housing 153. (See Figures 13 and 15.)

The indivdual sticks of gum C, duly wrapped and labelled individually as described, are fed out of the slot 147 and into an assembling mechanism now to be described and which also forms part of packaging mechanism more fully described in the co-pending application, Serial No. 426,566 above referred to.

From the slot 147 which is curved as shown in Figures 2 and 6, the gum sticks C are successively fed upon platform members, 154, sustained by springs, and against the spring pressed backing members 155. To hold the several sticks of gum in desired position, a spring pressed stop, 156, is provided in the path of movement of the gum sticks C onto the platform members 154.

As each gum stick C travels down the curved passage 147 to the platform members 154, it crowds the stop 156 downwardly about its pivot 156′, in which position the retainer remains until the gum stick C is pushed along the platform 154, by means of the transfer mechanism shortly to be described, for a sufficient distance to permit the stop 156 to return to its normal lifted position with its end back of the gum stick C.

One of the functions of the stop 156 of the character referred to is that provision is afforded upon the platform members for reception of the next following sticks of gum. Furthermore, should a stick of gum C overrun the feeding fingers 86 while traversing the curved passage 147, such stick of gum will be received upon the upper surface of the retainer and held there until the overrun fingers 86 catch up with the runaway gum stick and the normal co-action therebetween is resumed.

The transfer mechanism comprises spaced arms 157 carried upon the shaft 158 oscillating by means of a link 159 pivoted to the yoke 160, carried by the eccentric 161 upon the shaft 130.

In juxtaposition to the platform 154 are the rotating sprocket wheels, 164, driving the chains, 162, carrying the fingers, 163, one pair of which move beneath the platform, 154, as soon as the predetermined number of gum sticks C are collected thereupon. The continued movement of these fingers, 163, as the chains 162 are driven by the sprocket wheels, 164, feeds the predetermined number of gum sticks from the platform, 154, against waxed paper fed downwardly by rollers 165, 166 into the path of the feed of the assembled group for the packaging operation.

For the properly synchronized driving of the several groups of elements of the machine above referred to, the main shaft 69 is driven by the power pulley, 167 (Fig. 4), through the intermediary of the clutch operating mechanism 168, the said pulley, 167, being driven from a convenient source of power not shown. The line shaft, 169, (Fig. 1) is driven from the shaft, 69, through the intermeshing gears 170, 171, and in turn drives the gears 172, 173 meshing with gears 174, 175 on the shaft 169. The gear 172 is on the shaft 130 and the gear 173 is on the shaft 106. The chain 28 is driven from a sprocket on the shaft 106. The gear 177 (see Figure 7) is carried by the shaft 106, and drives the intermeshing train of gears 52, 179, 180, 181. The gears 180, 181 operate the shafts 182, 183 which in turn operate the gearing indicated generally at 124, of the label feeding mechanism more fully described in said copending application of John Van Buren, Serial No. 412,348. The chains 162 are given movement in synchronization with the chains 85 by means of the line shaft 169 through mechanism disclosed and described in said companion application Serial No. 412,348 whereby the movements of the collector and final wrapping and packaging elements of the grouped gum sticks C are coordinated with those of the primary wrapping and labelling mechanism herein described.

Again reverting to Figure 1, it will be observed that at desired points on the line shaft, 169, are provided overload clutches to discontinue the drive in the event of undue strain on any part of the mechanism, two of such clutches being indicated at 184 and 185.

These overload clutches are of the general type indicated at 184, wherein upon, for example, a stoppage of the gear 175 due to overload, the collar, 186, which is slidably mounted upon the line shaft 169 and held in spring-pressed engagement with gear 175, will recede from the gear 175, due to the camming action of the surfaces 187, 188 on the members 175, 186 and thus swing the connecting rod, 189, (see Figure 4) which will in turn throw out the clutch 168 through the slide rod 190, bell-crank 191 (see Figure 1), slide rod 192, and clutch operating lever 193.

At one end of the main shaft 69 within easy reach of the operator is a hand wheel 69' by means of which the machine may be turned over slowly.

Those who are skilled in the art will appreciate that one of the most important advantages of machines embodying the present improvements resides in the facts that from the initial feed of the gum sticks C the hopper, 78, to their final delivery duly wrapped and labelled, the sticks C are at all times preserved in predetermined spatial relation, so that at no time does any stick come into contact with any other stick and thereby an interference between sticks is prevented.

What I claim is:

1. Abutment members for holding a wrapper therebetween, the distance between the abutment members being less than the length of the wrapper whereby the wrapper will be flexed, and means for feeding an object to said wrapper.

2. Means for moving an article having a wrapper partly folded thereon with an end of the wrapper extending beyond the article, an adhesive covered surface, mechanism comprising an oscillating member arranged to engage one side of the extended end to bend it in one direction to present a desired side thereof to said surface and means for then engaging the other side of the end to bend it in the opposite direction.

3. Means for moving in a curved path an article having a wrapper partly folded thereon with an end of the wrapper extending beyond the article, an adhesive covered surface, mechanism comprising an oscillating member arranged to engage one side of the extended end to bend it forwardly to present a desired side thereof to said surface and means to then engage the other side of the end to bend it backwardly.

4. Means for moving in a curved path an article having a wrapper partly folded thereon with an end of the wrapper extending beyond the article, an adhesive covered surface, mechanism comprising an oscillating member arranged to engage one side of the extended end to bend it forwardly, and a guide to present a desired side thereof to said surface and means to then engage the other side of the end to bend it backwardly.

5. Means for moving an article having a wrapper partly folded thereon with an end of the wrapper extending beyond the article, an adhesive covered surface, an oscillating member for bending said extending end in one direction, and a guide for maintaining it in its bent position to present a desired side to said surface.

6. Means for moving an article having a wrapper partly folded thereon with an end of the wrapper extending beyond the article, an adhesive covered surface, an oscillating member for bending said extending end in one direction, and means for pressing said end against said surface.

7. Means for moving an article having a wrapper partly folded thereon with an end of the wrapper extending beyond the article, an adhesive covered surface, an oscillating member for bending said extending end in one direction, a guide for maintaining in its bent position to present a desired side to said surface, and means for pressing said end against said surface.

8. Means for moving an article having a wrapper partly folded thereon with an end of the wrapper extending beyond the article, an adhesive covered surface, mechanism comprising an oscillating member arranged to engage one side of the extended end to bend it in one direction to present a desired side thereof to said surface, means to then engage the other side of the end to bend it in the opposite direction, and means for completing the fold and sealing the wrapper on itself.

9. Means for moving an article having a wrapper partly folded thereon with an end of the wrapper extending beyond the article, an adhesive covered surface, an oscillating member for bending said extending end in one direction, a guide for maintaining said extended end in its bent position to present a desired side to said surface, and means for completing the fold and sealing the wrapper on itself.

10. Means for moving an article having a wrapper partly folded thereon with an end of the wrapper extending beyond the article, an adhesive covered surface, an oscillating member for bending said extending end in one direction, a guide for maintaining said extended end in its bent position to present a desired side to said surface, means for pressing said end against said surface, and means for completing the fold and sealing the wrapper on itself.

11. A plurality of wrapping mechanisms, a carrier having a continuous movement arranged to move an article into and out of said mechanisms, and means timed to coact with the movement of the carrier for actuating the wrapping mechanisms.

12. A plurality of wrapping mechanisms, a carrier having a continuous movement arranged to move an article into and out of said mechanisms, and means timed to coact with the movement of the carrier for actuating the wrapping mechanisms intermittently.

13. A plurality of wrapping mechanisms and a stationary folder, a carrier having a continuous movement arranged to move an article through said folder and into and out of said mechanisms, and means timed to coact with the movement of the carrier for actuating the wrapping mechanisms.

14. A plurality of wrapping mechanisms and a plurality of stationary folders, a carrier having a continuous movement arranged to move an article through said folders and into and out of said mechanisms, and means timed to coact with the movement of the carrier for actuating the wrapping mechanisms.

15. A wrapping machine comprising a carrier having a continuous movement, a plurality of wrapping mechanisms in the path of the carrier arranged to remove articles from the carrier and to deliver said articles back to the carrier.

16. A wrapping machine comprising a carrier having a continuous movement, a plurality of wrapping mechanisms in the path of the carrier arranged to remove articles from the carrier and to deliver said articles back to the carrier, and means timed to coact with the movement of the carrier for actuating the wrapping mechanisms.

17. A wrapping machine comprising a carrier having a continuous movement, a plurality of wrapping mechanisms in the path of the carrier arranged to remove articles from the carrier and to deliver said articles back to the carrier, and means timed to coact with the movement of the carrier for actuating the wrapping mechanisms intermittently.

18. A slidably supported supply hopper, a carrier arranged to move under the hopper to engage and remove articles therefrom one at a time, and means for raising the hopper and the articles therein vertically out of the path of the carrier.

19. A supply hopper, a plurality of wrapping mechanisms, a plurality of stationary folders, and a carrier arranged to engage and remove articles from the hopper one at a time and to move the articles in spaced relation through said folders and into and out of said mechanisms.

20. A supply hopper, a plurality of wrapping mechanisms, a plurality of stationary folders, a carrier arranged to engage and remove articles from the hopper one at a time and to move the articles in spaced relation through said folders and into and out of said mechanisms, and driving gearing arranged to impart a continuous movement to the carrier and to actuate the wrapping mechanisms intermittently.

In witness whereof, I hereunto set my hand this 24 day of November, 1920.

JOHN VAN BUREN.